Dec. 13, 1955 G. A. LYON 2,726,741
MEANS FOR COOLING AND DAMPING BRAKE DRUMS
Filed Dec. 26, 1951 2 Sheets-Sheet 2
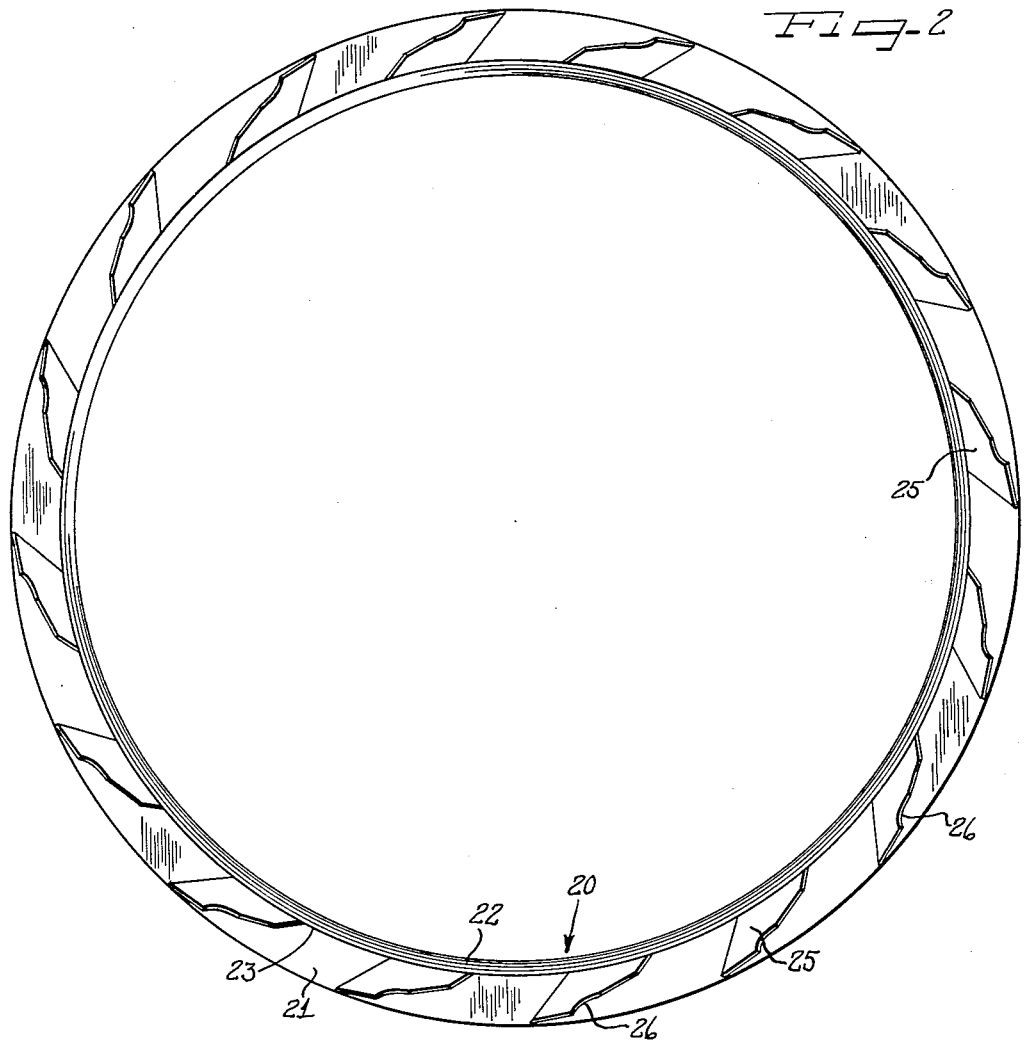
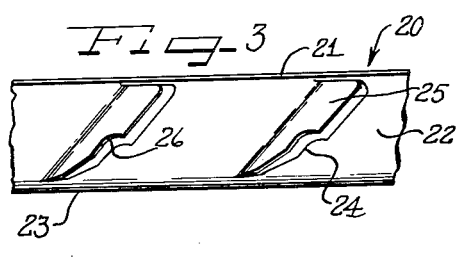
Inventor
George Albert Lyon

United States Patent Office 2,726,741
Patented Dec. 13, 1955

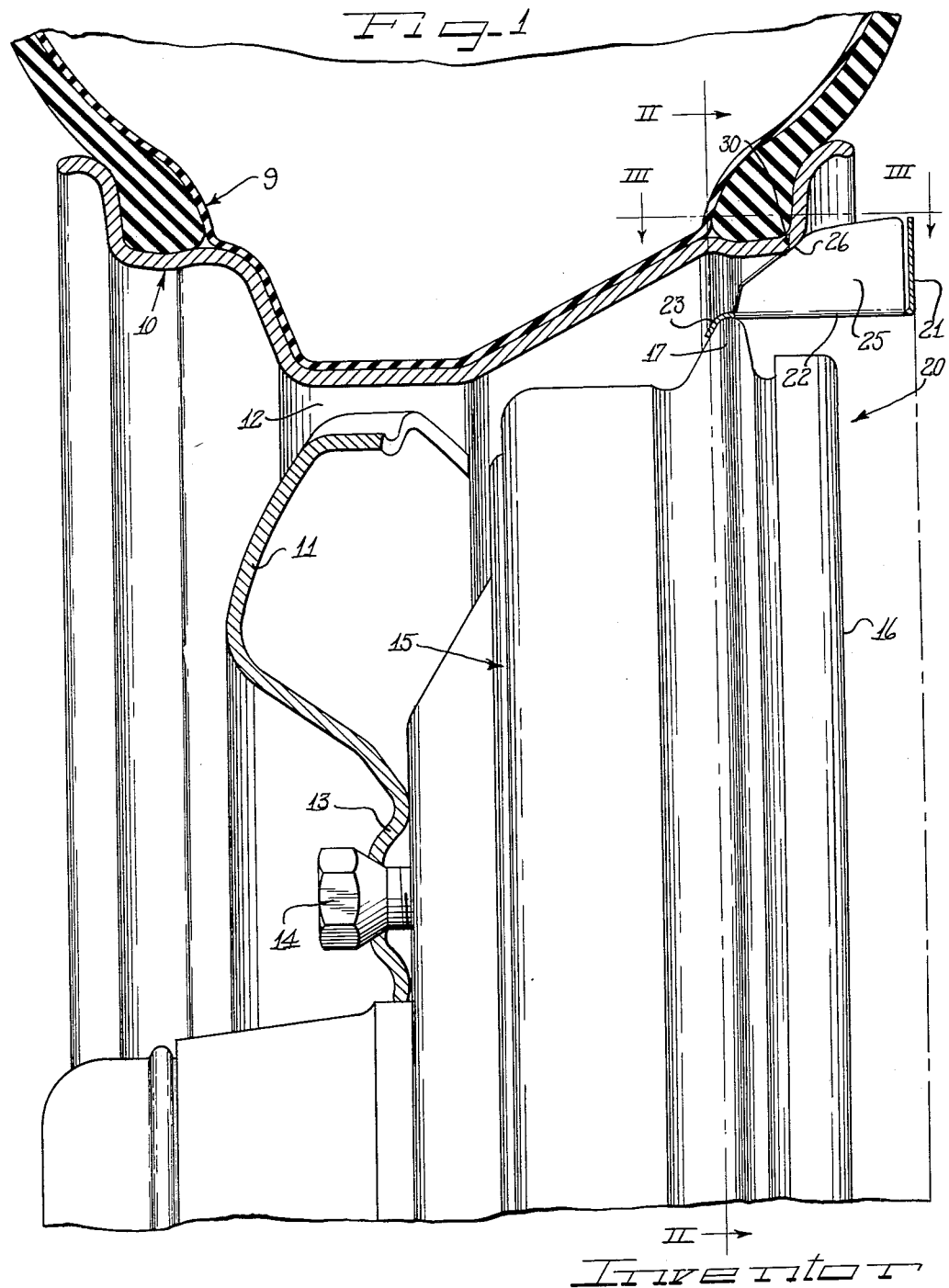

2,726,741

MEANS FOR COOLING AND DAMPING BRAKE DRUMS

George Albert Lyon, Detroit, Mich.

Application December 26, 1951, Serial No. 263,393

9 Claims. (Cl. 188—264)

This invention relates to a method of and means for cooling a brake drum of the type used on an automobile wheel.

An object of this invention is to provide a novel way of cooling a wheel brake drum and of at the same time damping the brake drum.

Another object of this invention is to provide a very simple form of brake drum cooling and damping ring which can be wedged in place on the brake drum by the simple act of mounting the wheel on the drum.

Yet another object of this invention is to provide a device of the aforesaid character which lends itself to economical manufacture on a large production scale.

In accordance with the general features of this invention there is provided in a damping and cooling device for a brake drum associated with a wheel having an outer flanged tire rim, a circular ring of angular cross section including a leg to extend axially of the wheel for engagement with the drum and a radially outwardly extending leg defining with the axial leg an annular air receiving pocket, the axial leg having spaced vanes projecting radially outward in the pocket for engagement with the flange of the tire rim to wedge resiliently the ring between the rim and the brake drum upon the mounting of the wheel on the drum.

Still another feature of the invention relates to providing the axial leg of the ring with a turned edge formed to be hooked over a protuberance on the brake drum.

Yet another feature of the invention relates to a new method of damping a wheel which comprises mounting the wheel on a brake drum and contemporaneous with the fastening of the wheel to the drum, wedging a resilient damping element against the outer surface of the drum.

Still another feature of the invention relates to using the damping ring to direct and circulate air through the wheel in a plurality of spaced streams about the periphery of the brake drum.

Other objects and features of this invention will more fully appear from the following detailed description taken in connection with the accompanying drawings which illustrate a single embodiment thereof and in which:

Figure 1 is a fragmentary vertical cross sectional view taken through an automobile wheel and showing a brake drum in elevation and to which my novel damping and cooling ring is applied;

Figure 2 is a side elevation of the damping and cooling ring taken on the line II—II of Figure 1 looking in the direction indicated by the arrows; and Figure 3 is a fragmentary plan view of a portion of the ring taken on substantially the line III—III of Figure 1 looking downwardly.

As shown on the drawings:

In Figure 1 I have shown a more or less conventional type of automobile wheel to which my novel damping and cooling device 20 is applied.

In the wheel structure the reference character 9 designates generally a conventional pneumatic tire and tube assembly mounted in the usual way upon a multi-flanged tire rim 10 which is in turn carried upon a dished wheel body or spider member 11. As is well known, this body member 11 is attached at spaced intervals to the base of the rim leaving transverse wheel openings 12 between the points of attachment. This type of structure causes the wheel body, in reality, to simulate a spoked wheel.

The body member 11 has a central bolt-on flange 13 adapted to be detachably secured in the usual way by cap screws 14 to a conventional brake drum 15. This brake drum, as is well known in the art, is of a cupped or bell shape and has an open or free edge 16 at its rear side.

Now in the use of this brake drum automotive engineers have found that with the increased requirements for braking power at high speeds, it is desirable that the brake drum be properly cooled. While the wheel openings 12 permit of the circulation of some air transversely through the wheel and over the peripheral surface of the brake drum, it appears desirable that this circulation be augmented.

In addition, it has been found that with the cupped or bell type drum there is a tendency for it to hum or vibrate which noise may be distracting.

Now as noted before it is the aim of my invention to accomplish in a simple manner both the dampening of the brake drum and the augmenting of the circulation of air over the brake drum. In order to accomplish these ends I provide a simple continuous circular ring designated generally by the reference character 10 and which is formed to be positioned between the outer surface of the brake drum and the flanged tire rim 10. I also propose to utilize the act of mounting and attaching the wheel to the brake drum as a means of firmly wedging this ring 20 in engagement with both the drum and the tire rim.

In doing this I make use of an annular rib or protuberance 17 on the outer periphery of the drum adjacent the drum edge 16 and also of a turned edge or flange 30 at the rear of the tire rim.

The ring 20 includes a radial leg 21 and a relatively longer axial leg 22 which legs are generally at right angles to each other and define an air receiving pocket between them. This ring is made of a continuous strip of metallic material such, for example, as coiled steel stock and may be formed in any suitable manner such as by rolling or the like. The ends of this ring may be suitably secured together if so desired as by means of welding and the like.

The free end of leg 22 is formed into a turned edge 23 adapted to a hook over the annular rib 17 so as to be supported thereon and so that the rib 17 can prevent rearward displacement of the ring from the wheel.

The axial leg 22 may be perforated at spaced intervals by any suitable press equipment, as indicated at 24 in Figure 3 to form tangs 25 which can be bent outwardly from the leg in the form of obliquely extending air vanes with the thickest portion of each vane in close proximity to the radial leg 21 of the ring. These vanes may be of any suitable number and while extending obliquely are all parallel to each other.

The edge of each vane is notched out at 26 for bottoming against the turned edge 30 (Fig. 1) of the flanged tire rim at the rear side of the wheel.

In the application of my device 20 to the brake drum the wheel is first removed and the device is then hooked over the brake drum rib 17 with the turned edge 23 of the device or ring 20 in engagement therewith. Then the wheel is pushed axially home on to the wheel and it is fastened in place by the cap screws 14. In the act of mounting and attaching the wheel to the brake drum the turned edge 30 of the rim 10 contacts the notched out portions 26 of the vanes thereby subjecting them to a wedging pressure which tightly wedges the ring in place between the tire rim and the brake drum 15.

Now, due to the fact that the vanes 25 are made from coiled steel stock which possesses resiliency, these vanes of necessity are under resilient pressure when wedgingly engaged by the tire rim and, as a consequence, the entire ring 20 is under tensioned retained engagement with the wheel and brake drum. In this manner the ring exerts a damping effect on the brake drum 15 whereby vibration and noise incident to the rapid turning of the brake drum with the wheel is minimized. In other words, the device 20 tends to damp out vibrations which might develop in the brake drum.

In addition the vanes 25 project rearwardly beyond the edge of the tire rim to a position where they can assist in the directing of a series of transverse air streams between the rim and the brake drum and through the wheel openings 12 thereby augmenting the cooling of the brake drum.

From the foregoing it is clear that I have employed a very simple form of vaned ring to accomplish two objectives, namely, one of damping the brake drum and of also augmenting the circulation of air over the surface of the brake drum to assist in cooling the same.

I claim as my invention:

1. In a damping and cooling device for a brake drum associated with a wheel including an outer flanged tire rim, a circular ring of angular cross section including a leg to extend axially of the wheel for engagement with the brake drum, a radially outwardly extending leg defining with the axial leg an annular air receiving pocket, and spaced vanes projecting radially outward from said axial leg in said pocket for engagement with a flange of the tire rim to retain wedgingly the ring between the rim and the brake drum upon mounting of the wheel on the drum.

2. In a damping and cooling device for a brake drum associated with a wheel including an outer flanged tire rim, a circular ring of angular cross section including a leg to extend axially of the wheel for engagement with the brake drum, a radially outwardly extending leg defining with the axial leg an annular air receiving pocket, and spaced vanes projecting radially outward from said axial leg in said pocket for engagement with a flange of the tire rim to retain wedgingly the ring between the rim and the brake drum upon mounting of the wheel on the drum, each of said vanes extending obliquely of the ring for progressively directing air over the outer surface of the brake drum.

3. In a damping and cooling device for a brake drum associated with a wheel including an outer flanged tire rim, a circular ring of angular cross section including a leg to extend axially of the wheel for engagement with the brake drum, a radially outwardly extending leg defining with the axial leg an annular air receiving pocket, and spaced vanes projecting radially outward from said axial leg in said pocket for engagement with a flange of the tire rim to retain wedgingly the ring between the rim and the brake drum upon mounting of the wheel on the drum, said axial leg having a turned free edge formed to be hooked over a portion of the brake drum to prevent rearward displacement of the ring from the drum.

4. In a damping and cooling device for a brake drum associated with a wheel including an outer flanged tire rim, a circular ring of angular cross section including a leg to extend axially of the wheel for engagement with the brake drum, a radially outwardly extending leg defining with the axial leg an annular air receiving pocket, and spaced vanes projecting radially outward from said axial leg in said pocket for engagement with a flange of the tire rim to retain wedgingly the ring between the rim and the brake drum upon mounting of the wheel on the drum, each of said vanes having a portion of its edge notched out to define a seat for an edge of the tire rim.

5. In a wheel structure including a brake drum and a flanged tire rim disposed about the drum and spaced thereabout to define a space therebetween, a brake drum cooling and damping ring disposed in said space and having radially outwardly projecting vanes resiliently wedged between and against both the rim and the brake drum for retaining the ring in said space.

6. In a wheel structure including a brake drum and a flanged tire rim disposed about the drum and spaced thereabout to define a space therebetween, a brake drum cooling and damping ring disposed in said space and having radially outwardly projecting vanes resiliently wedged between and against both the rim and the brake drum for retaining the ring in said space, said ring comprising a right angle channel with the vanes disposed in the angle of the channel.

7. In a wheel structure including a brake drum and a flanged tire rim disposed about the drum and spaced thereabout to define a space therebetween, a brake drum cooling and damping ring disposed in said space and having radially outwardly projecting vanes resiliently wedged between and against both the rim and the brake drum for retaining the ring in said space, said ring comprising a right angle channel with the vanes disposed in the angle of the channel, said channel having one of its legs engaged over and interlocked with the outer surface of the brake drum.

8. In a wheel structure including a brake drum and a flanged tire rim disposed about the drum and spaced thereabout to define a space therebetween, a brake drum cooling and damping ring disposed in said space and having radially outwardly projecting vanes resiliently wedged between and against both the rim and the brake drum for retaining the ring in said space, said ring comprising a right angle channel with the vanes disposed in the angle of the channel, each of said vanes being notched out to receive the tire rim therein.

9. In a wheel structure including a tire rim, a body part having air circulation openings therethrough, and a brake drum radially inwardly spaced from the wheel rim, a plurality of cooling and damping vanes resiliently wedged between and against both the outer surface of the drum and the wheel rim, and means maintaining the vanes in operative relation to one another and to the body part and brake drum.

References Cited in the file of this patent

UNITED STATES PATENTS

| | | |
|---|---|---|
| 1,864,969 | White | June 28, 1932 |
| 2,022,153 | Rogers | Nov. 26, 1935 |
| 2,131,614 | Chase | Sept. 27, 1938 |
| 2,197,583 | Koeppen et al. | Apr. 16, 1940 |
| 2,248,684 | Levy | July 8, 1941 |
| 2,265,938 | Eksergian | Dec. 9, 1941 |
| 2,299,796 | Chase | Oct. 27, 1942 |
| 2,489,522 | Chase | Nov. 29, 1949 |
| 2,659,460 | Lyon | Nov. 17, 1953 |